May 5, 1959

G. O. ELLIS ET AL 2,884,860

APPARATUS FOR CIRCULATING A LIQUID IN
A FLUID PRESSURE SYSTEM

Filed Nov. 23, 1956

GEORGE O. ELLIS
*INVENTOR.*

BY *Jack R. Springate*

ATTORNEY

GEORGE O. ELLIS
INVENTOR.

United States Patent Office 2,884,860
Patented May 5, 1959

2,884,860

APPARATUS FOR CIRCULATING A LIQUID IN A FLUID PRESSURE SYSTEM

George O. Ellis, Oklahoma City, Okla., assignor to Black, Sivalls & Bryson, Inc., Kansas City, Mo., a corporation of Delaware Application November 23, 1956, Serial No. 623,866

2 Claims. (Cl. 103—50)

The present invention relates to an apparatus for circulating a liquid through a fluid system which is under pressure. More specifically, the present invention relates to an apparatus for improving the efficiency of operation of a gas-powered pump which is designed to pump liquids into a high pressure fluid system.

Many systems for the processing of a high pressure fluid require the contacting of the high pressure fluid by a liquid and the subsequent removal of the liquid after it has contacted the high pressure fluid from the zone of contact. These liquids generally require some degree of regeneration and, therefore, are usually returned to atmospheric pressure for the regeneration cycle. Thus, the pump which withdraws the liquid from the regeneration storage has to pump against the pressure differential between the pressure of the fluid and the pressure of the regeneration storage of the liquid.

One common example of this type of system occurs in the natural gas industry whereby natural gas streams are contacted with a liquid dehydrating agent to remove a substantial portion of water and water vapor contained in the natural gas stream. The dehydration of natural gas streams may be accomplished by contacting the stream with a dehydrating agent such as diethylene glycol. The dehydrating agent is pumped from a reservoir into the sorber wherein the agent is allowed to intimately contact the natural gas stream. The agent, after having contacted the gas stream, will usually collect in a pool in some portion of the system and be withdrawn therefrom to be discharged to a regeneration unit. Usually, regenerators for glycols are operated at atmospheric pressure to obtain the advantages of regenerating at lower temperatures since the regeneration simply is vaporizing the water absorbed by the glycol. Assuming a regenerator were to be operated at pressures above atmospheric, higher temperatures would be required to vaporize the absorbed water. These temperatures could approach the decomposition or degradation temperature of the glycols. With pressurized regeneration the regeneration equipment would have to be designed to withstand the pressure. It takes a great deal of supply gas to pump the dehydrating agent liquid from atmospheric pressure up to the pressure of the natural gas stream because of the wide difference between stream pressure and regeneration pressure. Obviously, if the dehydrating agent could be received at approximately the pressure of the natural gas stream, there could be a great conservation of gas used to power the dehydrating agent pump. Therefore, the primary object of the present invention is to provide an apparatus for circulating a liquid through a high pressure fluid stream.

Another object of the present invention is to provide an apparatus for pumping a liquid into a fluid stream under pressure whereby the pressure of the fluid stream is balanced in the pump.

Still another object of the present invention is to provide an apparatus for conserving on gas consumption of a liquid pump designed to pump liquid into a fluid pressure system.

In accomplishing these and other objects of the present invention, I have provided improved apparatus illustrated in the accompanying drawings wherein.

Figure 1:
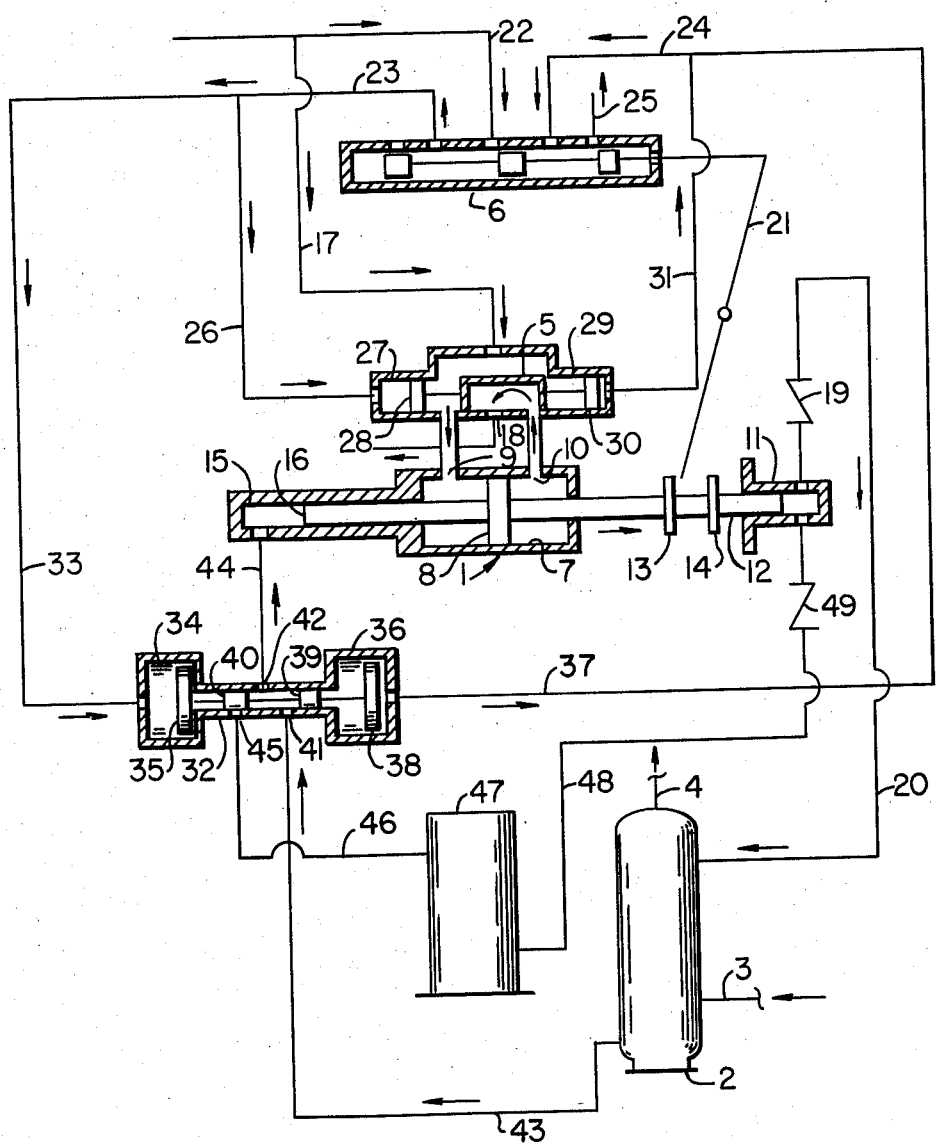
Fig. 1 is a diagrammatic view of a system utilizing the novel principles of the present invention in which the liquid is being pumped into a fluid pressure system.

Referring more in detail to the drawings:

Pump 1 illustrated in Fig. 1 is shown in a system whereby pump 1 is used to inject a liquid such as diethylene glycol into sorbing vessel 2. A fluid stream such as natural gas is directed into sorbing vessel 2 through inlet 3 and is discharged therefrom through outlet 4. Thus, vessel 2 functions to provide a zone of contact between the gas and the dehydrating agent.

The action of pump 1 is controlled by D-slide valve 5 which in turn is controlled by spool valve 6. Pump 1 consists primarily of a power cylinder 7, power piston 8, ports 9 and 10, liquid cylinder 11, liquid piston 12, collars 13 and 14, balancing cylinder 15 and balancing piston 16.

Power gas is supplied into power cylinder 7 through supply line 17. D-slide valve 5 is positioned in Fig. 1 to cause the power gas to flow into power cylinder 7 through port 9 and also to cause the power gas within cylinder 7 to the right of piston 8 to exhaust through port 10 and exhaust port 18. Thus, the exhausting of power gas from the right side of piston 8 within cylinder 7 and the supply of power gas to the left side of piston 8 in cylinder 7 will cause piston 8 to move to the right as shown in Fig. 1. This movement will cause piston 12 to move to the right within liquid cylinder 11 thereby pumping liquid through check valve 19 and line 20 into sorbing vessel 2. Also, at approximately the last portion of the stroke of piston 8 to the right, collar 13 mounted on piston 12 will contact toggle mechanism 21 which will actuate spool valve 6 from its position as shown in Fig. 1 to the position in Fig. 2. In Fig. 1 spool valve 6 is positioned so that supply gas flows in through line 22 and flows out through line 23. Also, gas is allowed to exhaust through line 24 to exhaust 25. The supply gas flowing through line 23 is delivered through line 26 to cylinder 27 and actuates piston 28 to control the position of D-slide valve 5. At the same time gas within cylinder 29 to the right of piston 30 is exhausting through line 31, line 24 and exhaust 25.

Spool valve 6 also controls slide valve 32 by causing the supply gas to flow through lines 23 and 33 into cylinder 34 wherein piston 35 is urged to move to the right. Also, gas is exhausted from cylinder 36 through lines 37 and 24 and exhaust 25 thereby allowing piston 38, which is also connected to piston 35, to move to the right as shown in Fig. 1. Valving elements 39 and 40 are connected to pistons 35 and 38 and are positioned so that when pistons 35 and 38 are moved to the right as shown in Fig. 1, ports 41 and 42 will be in communication with each other.

Thus, the liquid dehydrating agent draining from sorbing vessel 2 through line 43 will pass under pressure through port 41 between valving elements 39 and 40 and out port 42. This liquid is connected via line 44 into balancing cylinder 15.

As may be readily seen, piston 12 within cylinder 11 is pumping against the pressure within sorbing vessel 2 and the liquid passing from sorbing vessel 2 through line 43, slide valve 32 and line 44 into cylinder 15 will cause the pressure within sorbing vessel 2 to be exerted on balancing piston 16 thereby substantially overcoming the pressure against which piston 12 within cylinder 11 is pumping. For these reasons, only sufficient power gas is needed to initiate motion, to offset the system pressure drop and to overcome friction. It can be readily understood that the overcoming of the necessity of pumping against a very large amount of differential fluid pressure can easily diminish the amount of power gas used for pumping.

Figure 2:
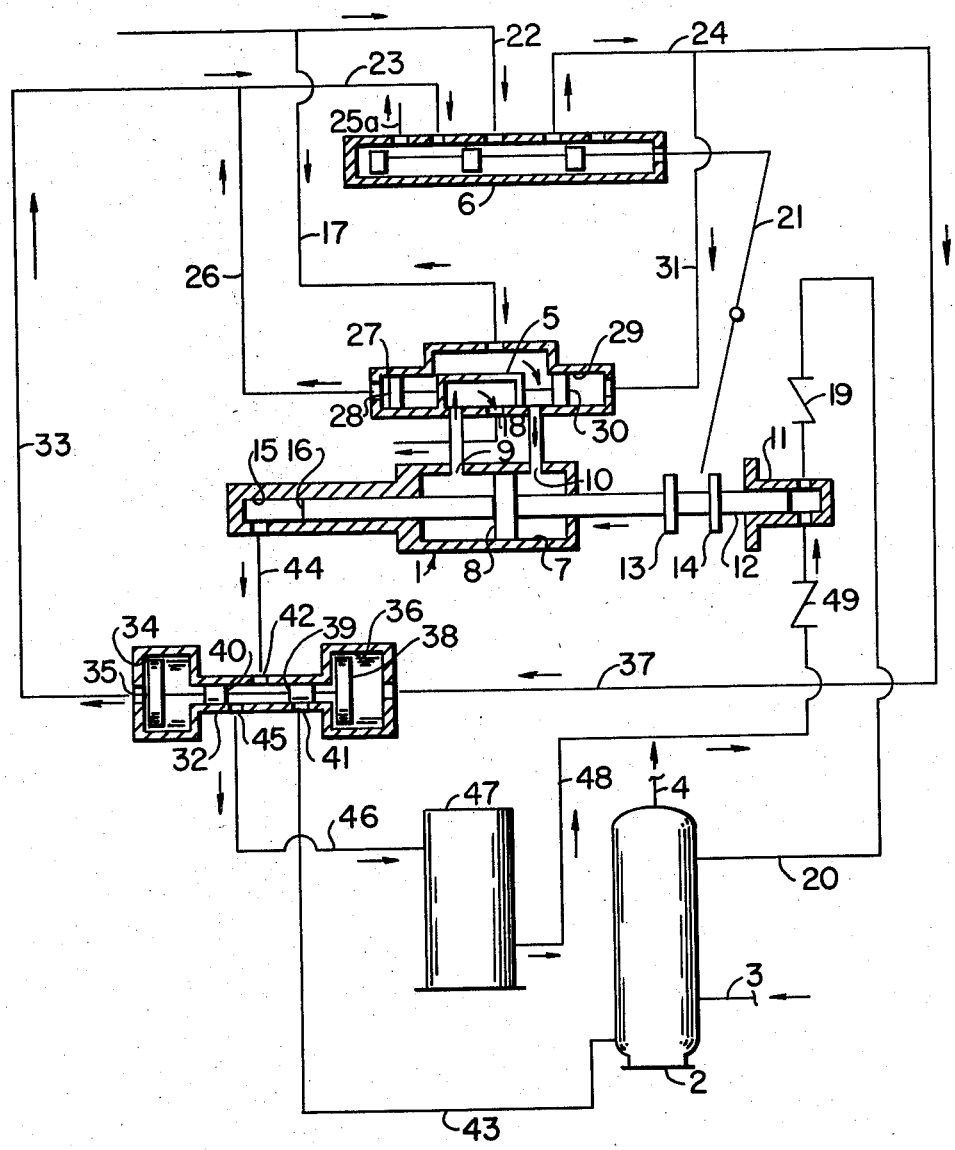
Fig. 2 is a view similar to Fig. 1 but differs therefrom by illustrating the pump in the position of an intake stroke wherein it is drawing liquid at atmospheric pressure from a reservoir.

For convenience in numbering, the numbers in Fig. 2 will correspond directly with the numbers used in Fig. 1 since identical equipment is meant to be shown except that its position has changed slightly from the equipment position as shown in Fig. 1. As shown in Fig. 2, spool valve 6 has already been actuated by toggle mechanism 21 when during the stroke of piston 8 to the right collar 13 engaged toggle mechanism 21 and moved it so that the valving members of spool valve 6 took the positions shown in Fig. 2. In this position, supply gas enters spool valve 6 through line 22 and is delivered through lines 24 and 31 into cylinder 29 wherein piston 30 is urged by supply gas pressure to move to the left. Gas within cylinder 27 is exhausted through lines 26, 23 and exhaust 25a allowing the gas pressure within cylinder 29 to control movement of pistons 28, 30 and D-slide valve 5. This movement of D-slide valve 5 allows power gas flowing through line 17 to enter cylinder 7 through port 10 and attempt to displace piston 8 to the left as shown in Fig. 2. In this movement to the left, piston 8 displaces gas previously within cylinder 7 through port 9 and exhausts through exhaust port 18.

Supply gas also flows through lines 24 and 37 into cylinder 36 thus tending to displace piston 38 to the left and gas is exhausted from the left of piston 35 within cylinder 34 through lines 33, 23 and exhaust 25a. This movement to the left of pistons 35 and 38 will move valving elements 39 and 40 to the left covering port 41 and opening port 45 whereby the liquid within cylinder 15 being displaced by the leftward movement of piston 16 will flow through line 44, ports 42 and 45 and line 46 into reconcentrator 47. Thus, all pressure will be relieved within balancing cylinder 15 since reconcentrator 47 will normally be operated at, or very nearly at, atmospheric pressure. The leftward movement of piston 8 within cylinder 7 will also cause piston 12 to move to the left within cylinder 11 thereby causing reconcentrated dehydrating agent to be withdrawn from reconcentrator 47 through line 48, check valve 49 and into cylinder 11. Thus, the pressures within balancing cylinder 15 and pumping cylinder 11 are balanced at all times. When piston 12 is moving to the left thereby having an intake stroke within cylinder 11, cylinder 15 is exposed to the pressure within reconcentrator 47. When cylinder 12 is moving to the right on a pumping stroke and pumping against the pressure within sorbing vessel 2, cylinder 15 is exposed to the pressure within sorbing vessel 2 thereby balancing the force which piston 12 would require to overcome this pressure. This balancing of the liquid injection piston can be readily understood to allow a large saving by reducing the amount of supply gas needed to operate pump 1.

Thus, it may be seen that I have provided an improved apparatus for circulating a liquid through a high pressure fluid stream by balancing the pump used to circulate the liquid. By providing this novel balancing of the pump, I have conserved on the gas consumption required to operate the pump to circulate the liquid through the high pressure fluid stream thereby effecting an economy of operation.

What I claim and desire to secure by Letters Patent is:

1. An apparatus for injecting a liquid into a fluid pressure system including, a reciprocatory pump having a power cylinder, a power piston in said power cylinder, a liquid pumping cylinder, a pumping piston in said liquid pumping cylinder, a balancing cylinder, a balancing piston in said balancing cylinder, said power piston being directly connected to said pumping piston and to said balancing piston, a valve controlling flow of power gas to said power cylinder, a valving mechanism connected to and controlling the admission to and exhaustion from said balancing cylinder of pressure fluid from said fluid pressure system, said valve and said valving mechanism both being piston operated, a pilot valve mechanism operably connected to said power piston and controlling the flow of actuating fluid to the pistons actuating said valve and said valving mechanism.

2. An apparatus for injecting a liquid into a fluid pressure system including, a reciprocatory pump having a power cylinder, a power piston in said power cylinder, a liquid pumping cylinder, a pumping piston in said liquid pumping cylinder, a balancing cylinder, a balancing piston in said balancing cylinder, said power piston being directly connected to said pumping piston and to said balancing piston and a valve controlling flow of power gas to said power cylinder, a valving mechanism connected to and controlling the admission to and exhaustion from said balancing cylinder of pressure fluid from said fluid pressure system, a first control piston controlling the position of said valve, a second control piston controlling the position of said valving mechanism, a pilot valve mechanism connected to said first and said second control pistons, said pilot valve mechanism controlling the flow of actuating fluid to said first and said second control pistons to position said valve and said valving mechanism and a mechanical linkage controlling the positioning of said pilot valve mechanism, said mechanical linkage being operably connected to said power piston.

References Cited in the file of this patent
UNITED STATES PATENTS

| | | |
|---|---|---|
| 252,110 | Jamieson | Jan. 10, 1882 |
| 1,016,768 | Pagliuchi | Feb. 6, 1912 |
| 1,820,236 | Loud | Aug. 25, 1931 |
| 1,956,612 | Brun | May 1, 1934 |
| 2,286,926 | Parenti | June 16, 1942 |